(12) United States Patent
Hiemeyer et al.

(10) Patent No.: US 8,281,558 B2
(45) Date of Patent: Oct. 9, 2012

(54) METHOD FOR THE PRODUCTION OF A VACUUM INSULATION ELEMENT WRAPPED IN A FILM, FILLED WITH POWDER

(75) Inventors: Jochen Hiemeyer, Würzburg (DE); Roland Caps, Kleinwallstadt (DE)

(73) Assignee: VA-Q-TEC AG (DE)

( * ) Notice: Subject to any disclaimer, the term of this patent is extended or adjusted under 35 U.S.C. 154(b) by 635 days.

(21) Appl. No.: 11/992,363

(22) PCT Filed: Sep. 22, 2006

(86) PCT No.: PCT/EP2006/009247
§ 371 (c)(1),
(2), (4) Date: Sep. 10, 2009

(87) PCT Pub. No.: WO2007/033836
PCT Pub. Date: Mar. 29, 2007

(65) Prior Publication Data
US 2011/0120620 A1    May 26, 2011

(30) Foreign Application Priority Data

Sep. 23, 2005   (DE) .......................... 10 2005 045 726

(51) Int. Cl.
*B65B 31/02*    (2006.01)
(52) U.S. Cl. ...................... 53/432; 53/436; 53/79; 53/86
(58) Field of Classification Search ................... 53/432, 53/433, 436–437, 79, 86, 87
See application file for complete search history.

(56) References Cited

U.S. PATENT DOCUMENTS

| | | | | |
|---|---|---|---|---|
| 4,154,045 A * | 5/1979 | Christensson | ................. | 53/432 |
| 4,571,924 A * | 2/1986 | Bahrani | ........................ | 53/453 |
| 4,683,702 A * | 8/1987 | Vis | ................................. | 53/433 |
| 4,941,310 A * | 7/1990 | Kristen | ........................ | 53/512 |
| 5,327,703 A * | 7/1994 | Cur et al. | ..................... | 53/434 |
| 5,364,577 A * | 11/1994 | Cur et al. | ..................... | 264/69 |
| 5,809,744 A * | 9/1998 | Villines et al. | ................ | 53/434 |
| 6,021,624 A * | 2/2000 | Richison et al. | .............. | 53/410 |
| 6,991,109 B1* | 1/2006 | Shannon et al. | ........... | 206/524.8 |
| 2001/0034999 A1* | 11/2001 | Xiong et al. | .................. | 53/434 |
| 2002/0144746 A1* | 10/2002 | Makino et al. | ................ | 141/12 |
| 2004/0231294 A1* | 11/2004 | Shannon | ....................... | 53/434 |
| 2008/0152267 A1* | 6/2008 | Shannon | ..................... | 383/113 |

FOREIGN PATENT DOCUMENTS

| | | |
|---|---|---|
| DE | 44 21 625 | 1/1996 |
| DE | 100 58 566 | 2/2002 |
| DE | 101 14 633 | 9/2002 |

* cited by examiner

*Primary Examiner* — Christopoher Harmon
(74) *Attorney, Agent, or Firm* — Pandiscio & Pandiscio

(57) ABSTRACT

The invention relates to a method for producing an especially panel-shaped vacuum insulation element which is wrapped in a film and is filled with a powder. According to the method, the unmolded, loose powder is filled, particularly poured, into the opening of a bag which is formed from a high-barrier film and is open on one side. A filter material that is permeable to air and impermeable to powder dust is fixed to the internal face of the film bag in the area of the opening of the filled film bag such that the interior of the bag is closed in a dust-tight manner while air can still be discharged. The interior of the dust-tightly closed film bag is then evacuated and the evacuated film bag is air-tightly closed in a vacuum.

35 Claims, 3 Drawing Sheets

METHOD FOR THE PRODUCTION OF A VACUUM INSULATION ELEMENT WRAPPED IN A FILM, FILLED WITH POWDER

BACKGROUND OF THE INVENTION

1. Field of the Invention

The invention relates to a method for the production of a vacuum insulation element wrapped in a film and filled with powder.

Using evacuated insulation materials, it is possible to achieve thermal conductivity levels that are lower by a factor of five to twenty than those possible with ventilated, conventional insulators. It is possible, for example, to produce very compact, highly insulating transport containers for temperature-sensitive goods or to realize extremely slim insulation structures in the construction field.

2. Description of the Prior Art

Pressure-resistant materials suitable for the core of evacuated insulation panels are generally available in panel form for better handling. These panels are usually pressed out of powder or cut from a pressed sheet and are commonly wrapped in an air-permeable nonwoven polyester fabric to reduce dust formation. This prevents dust from entering the vacuum chamber through the bag opening, which is a few millimeters high and located between the sealing bars, during the evacuation process and contaminating the sealing seams as well as the vacuum chamber.

The essentially dust-free core panels are heated to temperatures around 150° C., then wrapped with a vacuum-tight high-barrier film, placed in a vacuum chamber and evacuated. The remaining opening of the high-barrier film bag is located between two sealing bars. At the end of the evacuation process, the two sealing bars are pressed against one another and seal the bag opening by the effect of the heat. After the ventilation of the vacuum chamber, the atmospheric air pressure presses on the evacuated insulation panels.

Core panels of microporous silica powders exhibit a very fine pore structure and permit relatively high gas pressures without the thermal conductivity of the remaining gas playing a role. Thus, with these microporous materials, only a vacuum of 1 to 10 mbar is required in order to bring the thermal conductivity to 0.004 to 0.005 W/mK. Wrappings made of special high-barrier films, which have only a very thin, vaporized aluminum coating, ensure that the gas pressure in the core material rises only one mbar per year. However, the production process described above for the microporous silica powder and the complex pressing process for the powder panels means a relatively high price for the core material. In the production of thermal insulation panels, the core is usually cut or sawn out of large sheets of the compressed core material. This sort of cut-out leaves inevitable remainders, which must be disposed of as scrap and thus further add to the cost of the production method. The thickness of thermal insulation panels produced in this way is predetermined by the thickness of the sheets of the raw material and therefore cannot be altered. No forms other than panel-shaped can be produced with this known method.

SUMMARY OF THE INVENTION

These disadvantages of the known state of the art result in the problem that initiated the invention herein, to provide a production method for an evacuated thermal insulation body with nearly any shape and/or dimension, with which no waste is produced in the molding of its core.

The solution to this problem is found in production method comprising the following steps: The unmolded, loose powder is filled, particularly poured, into the opening of a bag which is formed from a high-barrier film and is open on one side; a filter material that is permeable to air and impermeable to powder dust is fixed to the internal face of the film bag in the area of the opening of the filled film bag, such that the interior of the bag is closed in a dust-tight manner while air can still be discharged; the interior of the dust-tightly closed film bag is then evacuated. Finally, the evacuated film bag is closed in an air-tight manner under a vacuum.

It would also be conceivable to fill the fine powder directly into a bag made from high-barrier film and evacuate it. This is not possible, however, because when evacuating through the bag opening, which is located between two sealing bars that are open during the evacuation, the fine powder is also sucked out. It may be possible to add coarse-grained materials, e.g., granulates, directly into a high-barrier film bag and evacuate in this way, since the granulate particles are held back by the narrow bag opening of 1 to 2 mm, for instance, and do not pass outside if their dimensions are larger than the thickness of a slit-like evacuation opening in a film bag. Such coarse-grained materials, however, would form a very irregular support surface below the film with sharp-edged or peaked projections, which, due to the pressure differential between the external atmospheric pressure and the internal vacuum would overload the film locally. In addition, due to the coarse pore structure, they would have to be evacuated to very low gas pressures in order to exclude the gas thermal conductivity in the pores.

Instead, in the method according to the invention, a loose, unmolded, fine-grained powder is introduced directly into a bag made from high-barrier film; a filter material, which retains the enclosed powder while allowing the air to escape, is fastened at the opening. Finally, the bag is evacuated in a vacuum chamber and closed in an air-tight manner. Before the vacuum chamber is ventilated, the bag can still be molded in the vacuum chamber by means of mechanical compression into nearly any shape and size, provided a bag of corresponding dimensions can be produced. The powder to be used is very fine, preferably with a grain size below 0.1 mm, particularly with a grain size below 0.05 mm, so that a very smooth support surface for the film is created during the compression process that scarcely harms the film layer at all. Nevertheless, this fine-grained powder is completely retained in the bag during the evacuation, even at high gas flows, by the filter material attached in the bag opening, so that the evacuation space is not contaminated. This also keeps the sealing seams of the high-barrier film bag free of dust, ensuring optimal welding and thus a permanent vacuum seal. Furthermore, since the preformation of a hard core is dispensed with, some process steps are eliminated, and unusable cutting scraps from cutting the core to the desired dimension are avoided. No more waste is created.

The high-barrier film bag, which is closed on three sides, is filled via the remaining opening with a certain, precalculated quantity of powder. Some types of powder absorb moisture from the air and must therefore be dried by the usual method before filling. Because the processing is so fast, the entry of moisture can be kept very low so that the added powder can be very well evacuated right away.

It has proven advantageous for the film bag to be made of an aluminum composite film and/or a metalized high-barrier film. In particular, it is advantageous to make the bag with a seam running over the surface, placed perpendicular to the opening, such as in the style of a side gusseted bag. In this way, the powder fill can later be easily compressed into a cuboid form. Film bags can also be made from two films laid on top of one another and sealed along the edges, with one side being left open at first for filling and evacuation. In this way, it is also possible to combine different films with one another. For example, a film bag can be made using an aluminum composite film on one side and a high-barrier film free of aluminum film on the other side.

A metal disk with sensor fabric is affixed on the internal face of the film bag to detect the internal gas pressure. Such a sensor disk is affixed to the high-barrier film from the inside using adhesive tape, for example, before the filling process. Then a check can be performed later to see whether the required gas pressures of from less than 2 mbar to less than 0.1 mbar, depending on the fineness of the powder used, were reached in the production of the vacuum insulation panel. This check must be performed for each vacuum insulation panel in order to be able to ensure the appropriate quality. The performance of such a check of the production process and in particular of the gas pressure in the vacuum insulation is described in German patent 102 15 213.

For the powder fill, microporous silica powders, perlite powders, powders from pulverized open-pored organic foams or pourable glass fiber materials with short fiber lengths are suitable. Of these, perlite powder is an especially economical material. The material costs of perlite are lower than the microporous silicas by a factor of 5 to 10. Perlite in the form of a comparatively coarse-grained granulate is used as fill without vacuum for conventional insulation purposes, such as in the construction field. However, perlite granulate with grain sizes in the range of 1 mm and over are not suitable for pressure-resistant vacuum insulation panels wrapped in film since the large pore sizes require a vacuum which the film can only maintain at the required low level for a short time. Perlite granulate cannot be compressed into panels without a binding material as is possible with microporous silica.

It has been shown, however, that in conjunction with the method according to the invention, perlite powder with very fine graining can now be used for vacuum insulation panels with good characteristics. It has been found that these fine perlite powders can exhibit a gas pressure of up to 2 mbar in the vacuum insulation panel before the thermal conductivity significantly exceeds the value of the thermal conductivity in the fully evacuated state (<0.1 mbar).

When the perlite powder is mixed with pyrogenic silica and/or precipitated silica, for example in a proportion of up to 40 wt-%, preferably from 10 to 30 wt-%, particularly in a proportion of 5-20% microporous silica, it is possible to raise the thermodynamic maximum gas pressure to values of more than 2 mbar. The mean pore size, which determines the maximum permissible gas pressure, is further reduced, since the microporous powder fills the spaces between the perlite fill with its loose, high-porosity structure. In this way, the gas pressure permissible at the end of the useful life increases to a value of 3 to 10 mbar and the useful life is extended compared to pure perlite powder.

The invention recommends that a drying agent be added to the powder, such as zeolite or calcium oxide. An adsorption of water vapor, whose presence impairs the vacuum, is achieved by adding a drying agent to the bag before or after filling (but before the filter material is sealed in). Based on similar considerations, a getter material can also be added to the powder.

While filling the powder, the film bag can bulge out by a factor of the later thickness of the vacuum insulation element. The bag is held so as to enable such a bulging by a factor of the intended final thickness. As a result, the fill height is at first considerably less than the later height of the vacuum panel.

The invention provides for a filter material to be affixed inside, near the opening of the film bag. There are several variants. In one variant, the filter material is folded and/or preformed into a trough shape before insertion. The trough has a length corresponding to the width of the finished vacuum panel and a thickness corresponding to the planned thickness of the vacuum panel, so that the affixed filter material, with the film bag, forms a cuboid internal volume in which the powder can be distributed.

Such a trough-shaped preformed filter element should be inserted in such a way that its opening points to the opening of the film bag. Such a filter element is preferably inserted or applied after filling at a distance of at least 2 cm from the top or opening edge of the film bag, e.g., 5 cm from the top edge. It must be ensured that a later sealing of the sealing layers of the film bag located opposite one another is still possible in the opening area.

The filter material can also already be fixed on one side of the interior of the film bag before filling with the powder in order to facilitate the handling of the filled film bag.

The filter material can be made from a polyester nonwoven, for example, which can be welded with the polyethylene sealing layer of the film bag under the influence of heat. Other, preferably laminar filter materials can also be used. It is advantageous to equip a surface with a thermally activatable adhesive lamination that binds with the sealing layer of the film bag. The film bag is placed with the interior fabric portion between the jaws of a sealing device and sealed such that the sealing layer of the high-barrier bag binds with the fabric portion. The fabric trough is sealed with both internal faces of the bag. The sealing can be accomplished with sealing tongs, for example, which are placed externally on both sides of the bag so that the melt layers of the bag adhere to the polyester fabric or to the adhesive lamination of the fabric. The inside of the polyester trough remains unsealed, however, so that a rectangular final form of the vacuum panel is later possible. By this means, the high-barrier bag is completely closed for the powder filling but still permeable to air. An adhesive layer that already binds with the sealing layer of the film bag at a temperature of about 100° C. is advantageous since the bag is subjected to a lower thermal load.

Experience has shown that it is beneficial to place a spacer with the same dimensions as the later thickness and width of the vacuum panel in the trough during sealing. The sealing tongs then press over the high-barrier film and the filter material on the spacer, made, for example, of metal, which acts as a counter-pressure panel. This prevents an improper sealing of the edge area of the vacuum insulation panel. The area of the edges or front sides is sealed separately with the help of the counter-pressure panel. After sealing, the auxiliary spacer is removed again.

Another possibility exists in inserting only one filter material (folded multiple times, e.g., twice) in place of a trough-shaped, preformed filter material. This is bonded with the sealing layer of the high-barrier bag over the fold point(s) at a distance of at least one half the thickness of the finished vacuum panel. The sealing seam is made with the sealing tongs on the flat bag. In this way, no gap forms on the two exterior or front sides when sealing against powder dust. This gap can be closed with a clamp applied from without. After the evacuation and closure of the film bag in the vacuum chamber, this clamp must, however, be removed by a suitable mechanism.

As a spacer, a rod made of a pressure resistant, open-pored insulation material, such as a compressed silica, has particularly proven itself useful. This rod is enveloped with the filter material on all sides. The length of the rod corresponds to the width of the later vacuum panel, the thickness of the rod approximately to the thickness of the vacuum panel, and the width of the rod should correspond approximately to its thickness. The spacer made of insulating material is left in the bag and becomes part of the well-insulating vacuum insulation panel. The rod, enveloped, for example, with a polyester nonwoven fabric, is inserted in the opening of the high-barrier bag filled with powder so far that it later forms an edge area of the vacuum panel. Then the polyester fabric is bonded on both sides to the surface of the bag using a sealing device with the internal face of the bag. The two smaller edge or front surfaces can be sealed at the same time or remain unsealed. So that the inserted rod also takes up a lateral counter-pressure, a device can later press on the unsealed edge area from the side during the evacuation in the vacuum chamber and close this area in a powder-tight manner. From that standpoint, such a spacer is suitable, especially in conjunction with a filter material that is not preformed in a trough shape, but rather folded strips.

So that later during the evacuation a gap forms between the high-barrier film and an inserted spacer, the filter material can additionally be provided with a small fold running in the longitudinal direction of the interior of the bag. In the area of the ends of the spacer or the rod, this fold can also be thermally bonded for better fixation. In the middle area of the rod/spacer, on the other hand, the filter material, together with the affixed high-barrier film, can rise from the surface of the rod/spacer and form a channel for the expulsion of air. Another advantage to this method is that a good edge formation on the closure side of the film bag is possible since the inserted rod is made of insulating material.

If a spacer is used with holes perpendicular to the cross section of the opening, still more air can escape from the interior of the film bag during evacuation without the dust reaching the exterior. In this way, the bag is completely closed for the powder filling but remains permeable to air during the evacuation process.

For better thermal bonding of a polyester nonwoven fabric with the sealing layer of the film bag, an adhesive fabric, particularly a polyolefin adhesive fabric, can be inserted. In this way, the adhesion/sealing temperature can be considerably lowered so that the film bag is under less thermal load.

After the powder-tight bonding of the filter material, the powder in the high-barrier film bag can be shaped as desired, preferably by vibration and/or compression. Excess air can thus escape. The compression pressure should be no more than 1 bar maximum, if possible, so that the lowest possible density is achieved together with a low thermal conductivity. For perlite powder, it has proven advantageous in this connection to aim for a density between 140 and 250 kg/m$^3$ in the compression, particularly between 150 and 200 kg/m$^3$. In the case of microporous silica powder, however, it has been shown that a precompression can only be achieved to a small extent in this way. The shaping occurs preferably by means of a pressing device after the evacuation and sealing in the vacuum chamber.

Finally, it is consistent with the teaching of the invention for the film bag to be evacuated with or without shaping of the powder bag. In that case, the powder-filled high-barrier bag is placed in a vacuum chamber as usual, the opening coming to rest between two sealing bars. The vacuum chamber is evacuated together with the film bag and the remaining opening of the film bag sealed. Fine perlite can be evacuated to an initial gas pressure of 0.1 mbar, for example. The filter system built into the film bag according to the invention thus prevents the exit of the powder with good evacuability at the same time.

Before the ventilation of the vacuum chamber, the sealed, powder-filled film bag can still (again) be shaped as desired, even if this has already occurred previously. According to experience, shaping the powder bag by external air pressure alone during the ventilation often results—as is also the case with precompression outside the vacuum chamber—in very misshapen panels. By means of a suitable frame on the sides of the vacuum bag and a compression device acting from above or from below on the surface of the film bag, the already sealed bag can be molded into a cuboid shape, for example. A vibration device helps to evenly distribute the loose powder in the powder bag that is not under load at the beginning of the mechanical compression. It is also possible, however, to emboss structures on the vacuum panel by means of the surface form of the press. For example, parallel depressions make it possible for the evacuated insulation panel to later curve or be curved perpendicular to these indentations after the ventilation of the vacuum chamber.

After the shaping of the powder-filled film bag in the vacuum chamber, the chamber is ventilated, the vacuum panel is subjected to atmospheric pressure and can be removed from the chamber. The atmospheric pressure gives it a fixed shape so that the panel is easy to handle. In addition to the sealing seam applied in the chamber, another sealing seam can subsequently be applied outside the chamber closer to the edge of the vacuum panel, enabling a better edge shape.

BRIEF DESCRIPTION OF THE DRAWINGS

Other features, properties, advantages and effects based on the invention arise from the following description of a preferred embodiment of the invention and based on the included drawing. Shown are.

DESCRIPTION OF THE PREFERRED EMBODIMENT

Figure 1:
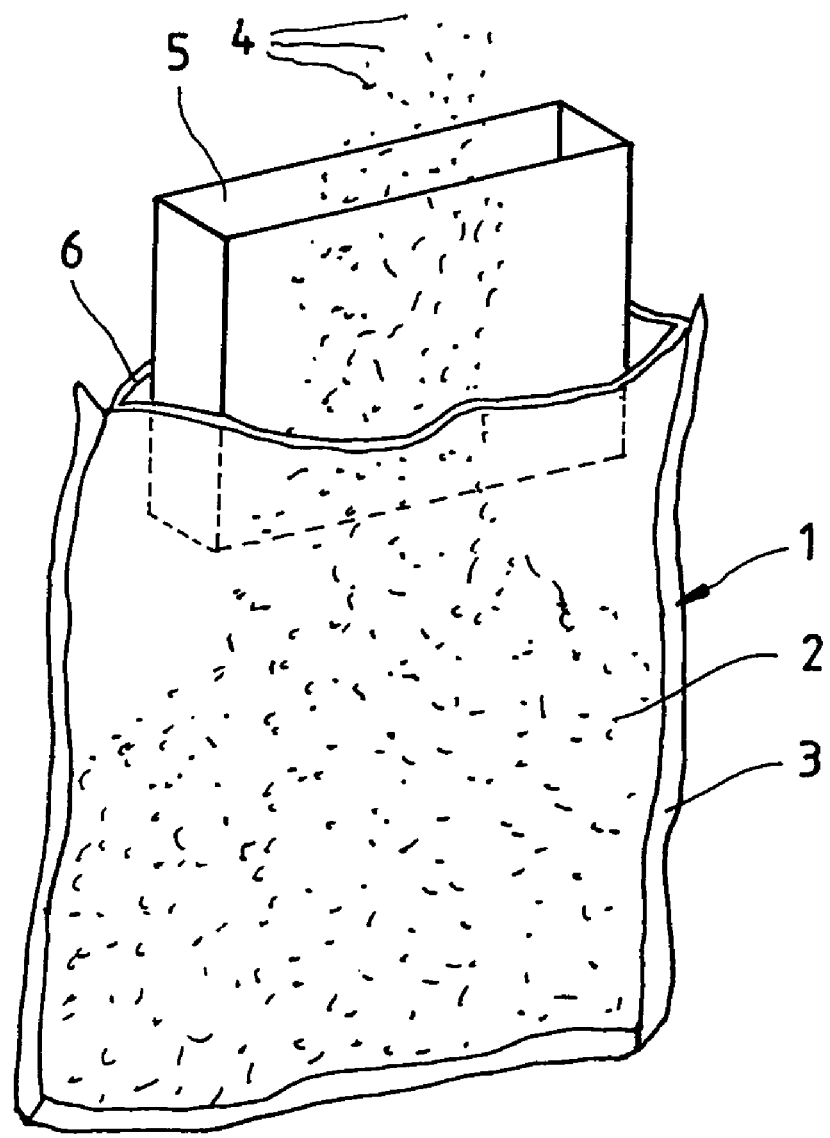
FIG. 1 The filling of a film bag with a pourable powder material in a perspective view.
Figure 2:
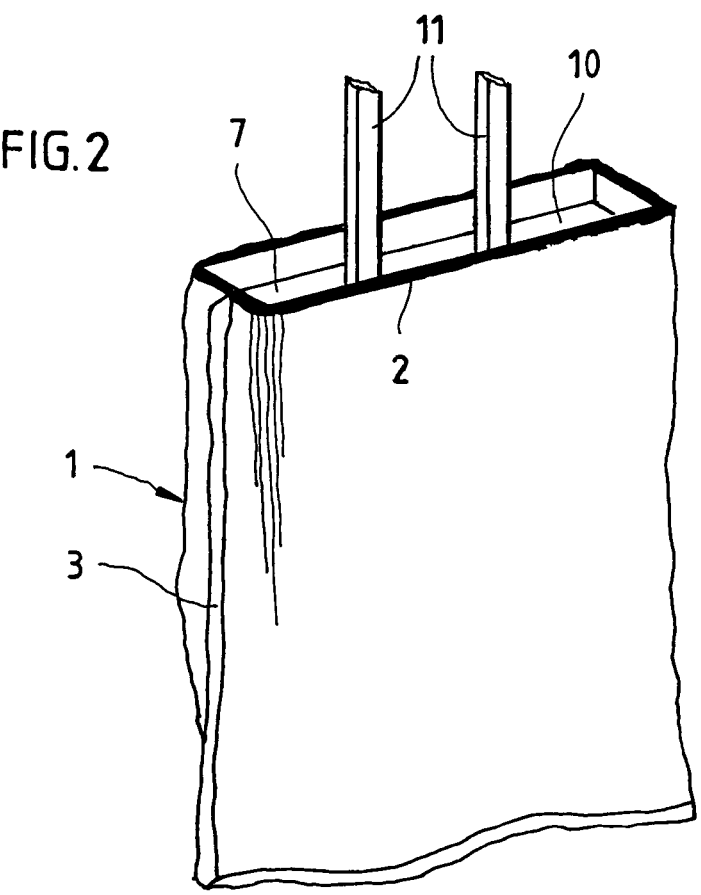
FIG. 2 The insertion of a filter material in the opening of the filled film bag in a perspective view.
Figure 3:
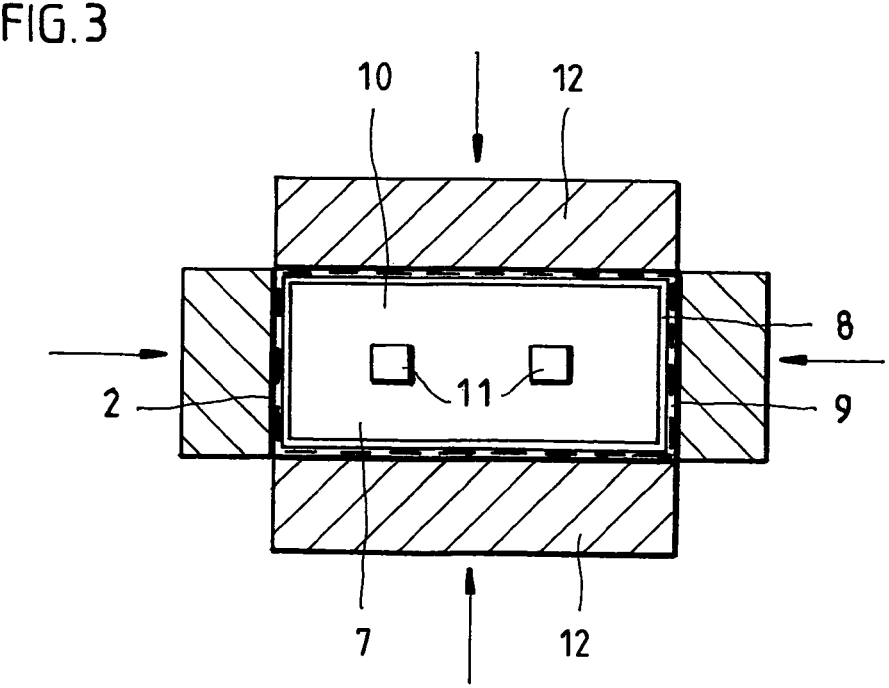
FIG. 3 A top view of FIG. 2.
Figure 4:
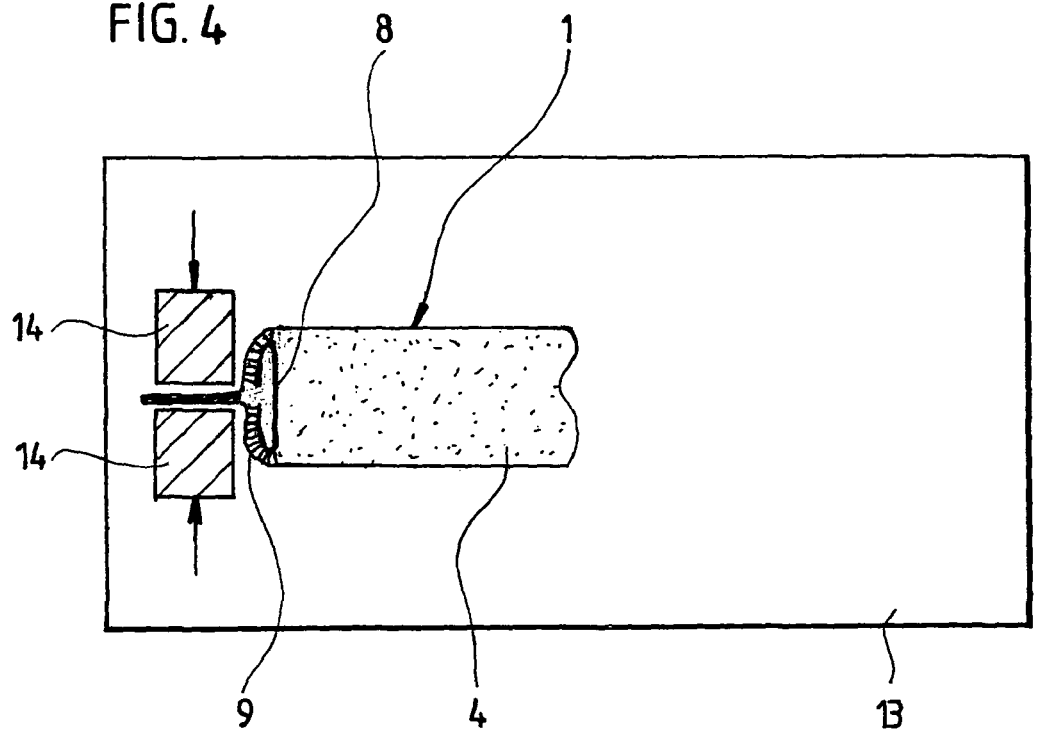
FIG. 4 The air-tight closure of the evacuated film bag.
Figure 5:
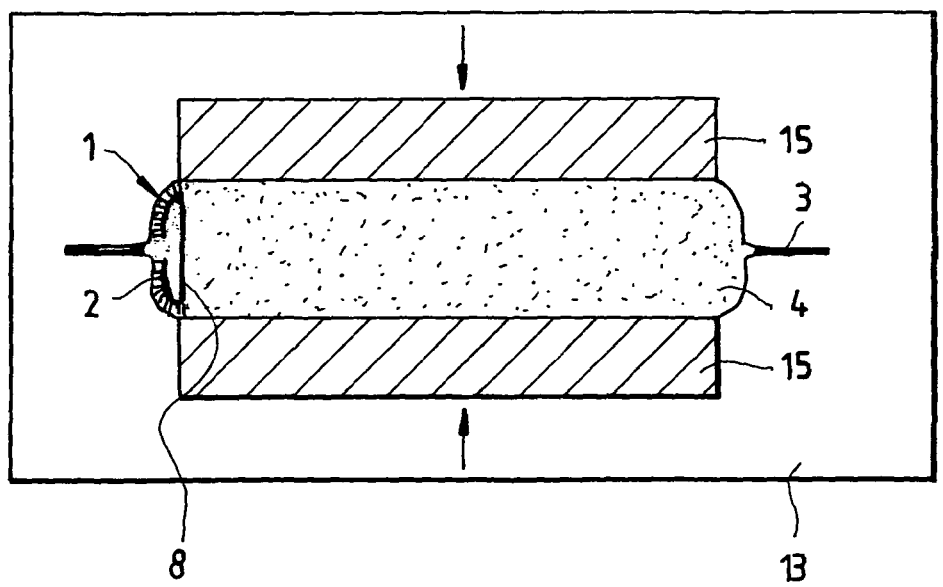
FIG. 5 The compression of the evacuated film bag in the vacuum chamber.

Into a flat bag 1, which is open on one side, 450 mm×470 mm in size, and made from two congruent aluminum composite films 2 which are welded together along several edges 3, 900 g of loose, pourable perlite powder 4 with a grain size of less than 0.05 mm are poured. A funnel 5, or similar device, can be used for this.

Subsequently, a trough-shaped polyester nonwoven fabric is introduced into an opening 6 in the film bag 1 using a spacer 7 made of metal, for example, with the dimensions 400 mm×30 mm×5 mm. The spacer 7 supports trough-shaped filter material 8, particularly a polyester nonwoven, which is coated on the provided adhesive surfaces facing the interior of the film bag with an adhesive film and enables a relatively low sealing temperature around 100° C. The spacer 7 is introduced until its top edge 10 is at a distance of about 65 mm below the top opening 6 of the film bag 1. The spacer 7 is held by rods 11 protruding from the top side 10.

Depending on the embodiment, a sealing seam is generated from both sides with jaws 12 of hand sealing tongs parallel to the interior bars at about the height of the edge of the spacer 7, in order to weld the filter material 8 with the film bag 1. The polyester fabric 8 is bonded to the bar with the sealing layer of the high-barrier bag 1. A further welding takes place with later sealing jaws. In this state, the film bag 1 is placed in a vacuum chamber 13 and evacuated.

In a subsequent step, the opening 6 of the film bag 1 is completely welded by means of welding jaws 14 arranged in the vacuum chamber 13.

Thereupon the evacuated film bag 1 is shaped still within the evacuated vacuum chamber 13 by a press 15 arranged inside it in the form of a panel of 400 mm×400 mm×30 mm. As long as the vacuum chamber is still evacuated, the film bag 1 can still be easily shaped. The shaping process can possibly be supported by a vibrating device in which the jaws of the press 15 are arranged on the vibrating device, for example, and vibrated by it.

After the vacuum chamber 13 is ventilated, the external atmospheric pressure presses the finished panel- or cuboid-shaped vacuum panel strongly together, as a result of which the powder 4 is held in the shape it assumed in the press 15. The welding tabs protruding on the edge side 3 are folded on the front sides of the panel, finishing it.

After the end of the production process, the gas pressure in the finished panel is checked in order to determine whether the required gas pressure levels from below 0.1 mbar up to 0.05 mbar were reached in the production of the vacuum insulation panels. This check must be performed for each vacuum insulation panel produced, in order to be able to ensure the appropriate quality.

Vacuum insulation panels produced in this way have a thermal conductivity between 0.006 and 0.007 W/mK at a density of about 200 kg/m$^3$ for a fill of fine perlite powder 4 in the evacuated state. With a gas pressure of 2 mbar, the thermal conductivity increases to a level of 0.010 W/mK. This can be viewed as the maximum permissible gas pressure at the end of the useful life.

An adsorption of water vapor, whose presence impairs the vacuum, is achieved by adding a drying agent, e.g., zeolites or calcium oxide, to the heated powder 4 before or after adding to the bag 1 (but before the trough-shaped filter material 8 is sealed in).

Film wrappings made from aluminum composite film cause gas to enter at a rate of 0.6 mbar·liter/(m$^2$·year). The water vapor entry is very low. With a 30 mm thick vacuum insulation with a fine perlite fill, the gas pressure increases in this case only by 0.02 mbar per year. With a maximum gas pressure of 1 mbar, it therefore takes 50 years until this limit is reached. Vacuum insulation panels of fine perlite wrapped in aluminum composite film thus also find applications in the construction field. However, the thermal bridge generated by the aluminum film at the edge of the vacuum insulation panels must also be taken into consideration. This can be reduced to a fraction if only large-format vacuum insulation panels with a minimum size of 0.5 m$^2$ are used and a two-layer arrangement is executed, in which the second layer covers the joints of the first layer.

Applications of the vacuum insulation panels with a fine perlite fill are also interesting for the insulation of freezers. Here, in the context of the vacuum-tight wrapping, a combination of a metalized film on the face that is turned toward the cold area of the freezer wall and an aluminum composite film on the opposite face is possible. Because of the lower diffusion of gases and water vapor through the metalized composite film at the lower temperatures from −20 to −30° C., a sufficient life span of the vacuum insulation from 10 to 20 years can also be achieved here. The thermal bridges are due to the low transmission through the metalized high-barrier film significantly less than with the execution with double-sided aluminum composite film.

What is claimed is:

1. A method for the production of a panel-shaped evacuated heat insulation element, enclosed in film of the form of a flat film bag (1) filled with an unmolded, loose powder (4), the method comprising the steps of:
   a) providing a filter material (8) which is folded or preformed in the shape of a trough with one open side face, the length of the trough corresponding to the width of the evacuated heat insulation element and the width of the trough corresponding to the thickness of the evacuated heat insulation element;
   b) in the area of an opening (6) on one side of the film bag (1), the trough-shaped filter material (8), which is air-permeable but impermeable to powder dust (4), being fixed to an internal face of the film bag (1) such that the bag's interior is sealed off in a dust-tight manner but adapted to permit air to exit;
   c) evacuating the interior of the dust-tight, filled sealed film bag; and
   d) sealing the evacuated film bag in an airtight manner under a vacuum.

2. Method according to claim 1, wherein the film bag (1) is an aluminum composite film (2) and/or a metalized high-barrier film (2).

3. Method according to claim 1, wherein the film bag (1) is on a first side of an aluminum composite film (2) and on a second side of a high-barrier film free of aluminum film (2), the sides being sealed with one another along edges (3) thereof.

4. Method according to claim 1, wherein on the internal face of the film bag (1) a metal disk with sensor fabric is affixed, and is adapted to non-destructively detect internal gas pressure in the heat insulation element.

5. Method according to claim 1, wherein the powder (4) contains pyrogenic silica and/or precipitated silica.

6. Method according to claim 5, wherein the powder (4) contains perlite powder with a grain size smaller than 0.1 mm.

7. Method according to claim 6, wherein a proportion of the perlite powder of up to 90%, and the pyrogenic and/or precipitated silica is mixed in a proportion of at least 10%.

8. Method according to claim 1, wherein the powder (4) contains a drying agent selected from zeolite and calcium oxide.

9. Method according to claim 1, wherein the powder (4) contains a getter material.

10. Method according to claim 1, wherein the film bag (1) is adapted to bulge out by a factor of the thickness of the heat insulation element when the powder (4) is filled.

11. Method according to claim 1, wherein a selected one of a laminar, generally two-dimensional element and a voluminous, three-dimensional element is used as the filter material (8).

12. Method according to claim 1, wherein a nonwoven polyester fabric is used as the filter material (8).

13. Method according to claim 11, wherein the laminar filter material (8) is folded from a strip, the length of the strip corresponding generally to a width of the film bag (1).

14. Method according to claim 11, wherein the laminar filter material (8) is preformed in a generally trough-like shape with one open side face, the length of the trough generally corresponding to the width of the heat insulation element and the width of the trough generally corresponding to the thickness of the heat insulation element.

15. Method according to claim 14, wherein the height of the laminar filter material (8) perpendicular to its open side is about 0.3 to 1.5 times as great as the width of the trough.

16. Method according to claim 14, wherein the filter material (8) is inserted in the opening (6) of the filled film bag (1) in such a manner that the opening of the trough points outwardly towards the opening (6) of the film bag (1).

17. Method according to claim 11, wherein the laminar filter material (8) is inserted at a distance of at least 2 cm from the opening of the filled film bag in such a manner as to adapt the bag to closing and sealing the bag opening.

18. Method according to claim 17, wherein the filter material (8) is placed around a spacer (7), whose dimensions correspond to the width and thickness of the finished vacuum panel and introduced in the opening (6) of the film bag (1) together with the spacer (7).

19. Method according to claim 18, wherein the spacer comprises a bar-shaped spacer (7) of metal which is removed before placement in the vacuum chamber (13).

20. Method according to claim 18, wherein the spacer comprises an open-pored insulation material with a pressure load capacity of at least 20 kPa at 10% compression.

21. Method according to claim 20, wherein the spacer (7) comprises a selected one of a compressed silica powder and an open-pored foam and remains in the vacuum panel.

22. Method according to claim 20, wherein the spacer (7) is provided with holes extending in a direction perpendicular to the cross section of the bag opening (6) and having a diameter of 1 mm to 5 mm.

23. Method according to claim 18, wherein the filter material (8) and the spacer (7) are joined as an abutment from the outside with a sealing device (12), a sealing surface being on the internal face of the film bag (1).

24. Method according to claim 23, wherein the filter material (8) is joined using the sealing device (12) with the interior sealing layer of the film (2), at a width of 5 mm to 10 mm.

25. Method according to claim 1, wherein the filter material (8) is bonded to the internal face of the film bag (1).

26. Method according to claim 1, wherein the filter material (8) comprises a polyester nonwoven fabric, and is joined by means of a laminar adhesive material (9) comprising a polyolefin adhesive fabric, under the influence of temperature, with an interior sealing layer of the film bag (1).

27. Method according to claim 13, wherein the filter material (8) of the folded strips, is sealed on at least two sides with a sealing layer of the film bag (1), sealing seam(s) running along an open side of the folded strip.

28. Method according to claim 27, wherein one or more surface areas of the film bag (1), not sealed with the film strip, are compressed together with a clamp, such that no powder (4) can escape.

29. Method according to claim 28, wherein the clamp is removed after the film bag (1) is evacuated and sealed in a vacuum chamber (13).

30. Method according to claim 25, wherein the bonded filter portion (8) forms a cuboid-shaped interior volume with the film bag (1) in which the powder (4) is adapted to distribute itself.

31. Method according to claim 30, wherein the powder (4) is molded into a desired shape by vibration and compression after the filter material (8) is fixed to the internal face of the film bag (1) such that the bag's interior is sealed off in a powder-tight manner.

32. Method according to claim 29, wherein the evacuated and sealed film bag (1) is molded into the desired shape by vibration and compression in the vacuum chamber (13).

33. Method according to claim 31, wherein the powder (4) is molded into the desired shape by vibration and compression after the filter material (8) is fixed to the internal face of the film bag (1) such that the bag's interior is sealed off in a powder-tight manner and after the film bag (1) is evacuated.

34. Method according to claim 33, wherein the powder (4) in the film bag (1) is compressed to a density of 180 to 220 kg/m$^3$.

35. Method according to claim 34, wherein structures are embossed on a surface of the film bag (1) filled with powder (4) during the compressing.

\* \* \* \* \*